June 25, 1968   P. E. DAY   3,390,057
APPARATUS FOR VAPOR COMPRESSION DISTILLATION OF WATER
Filed Dec. 14, 1964   5 Sheets-Sheet 4

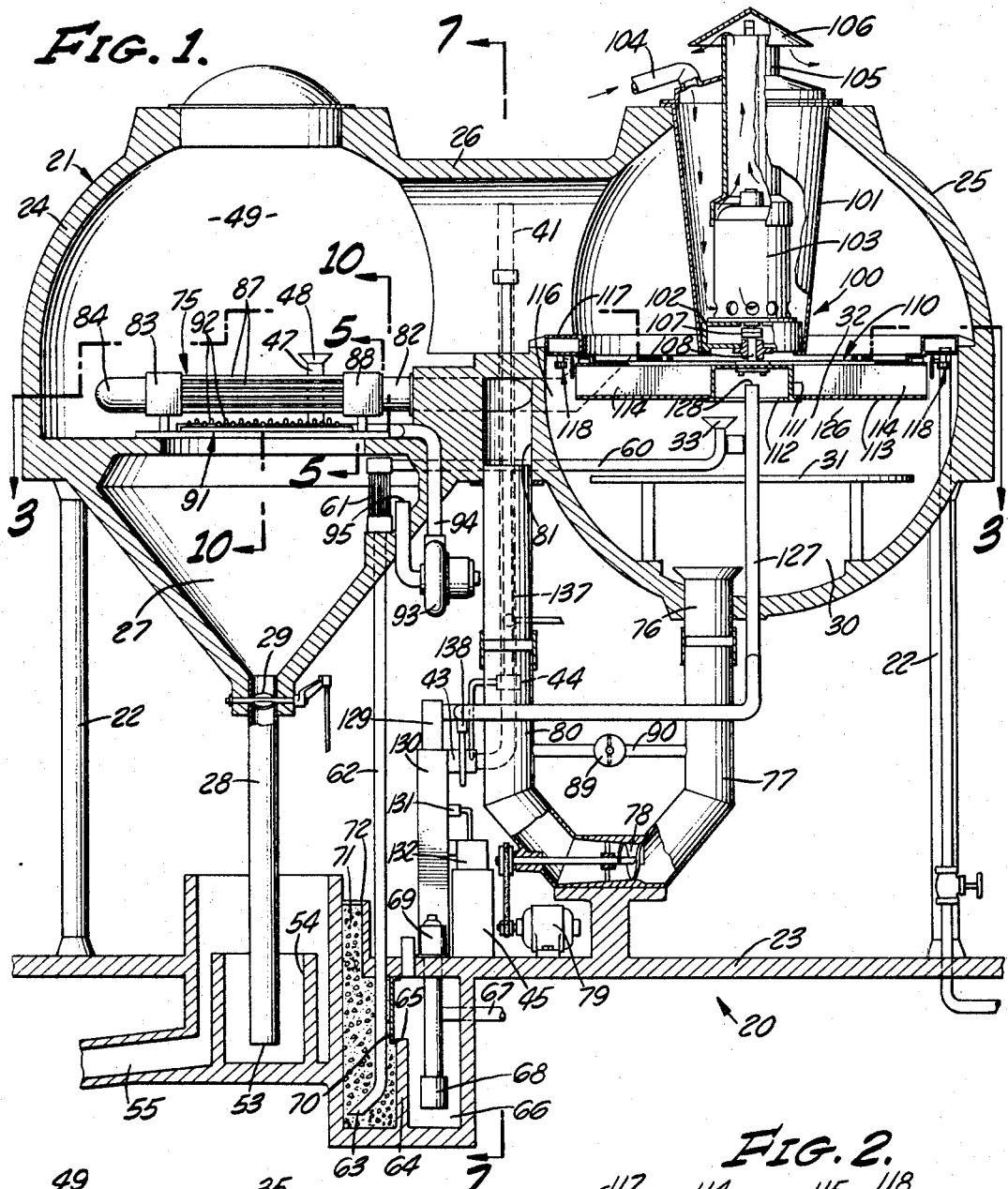

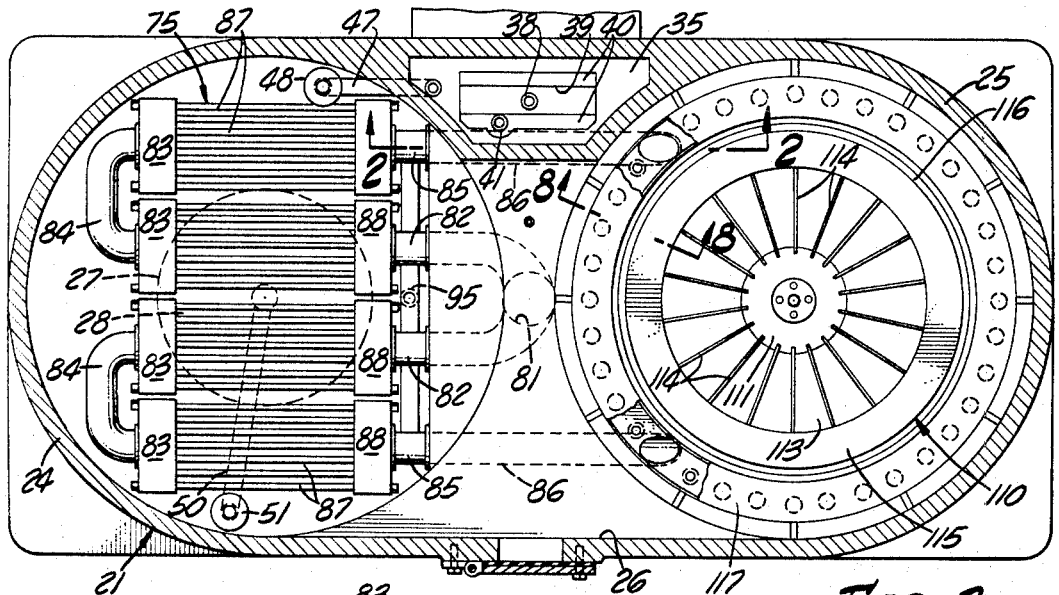

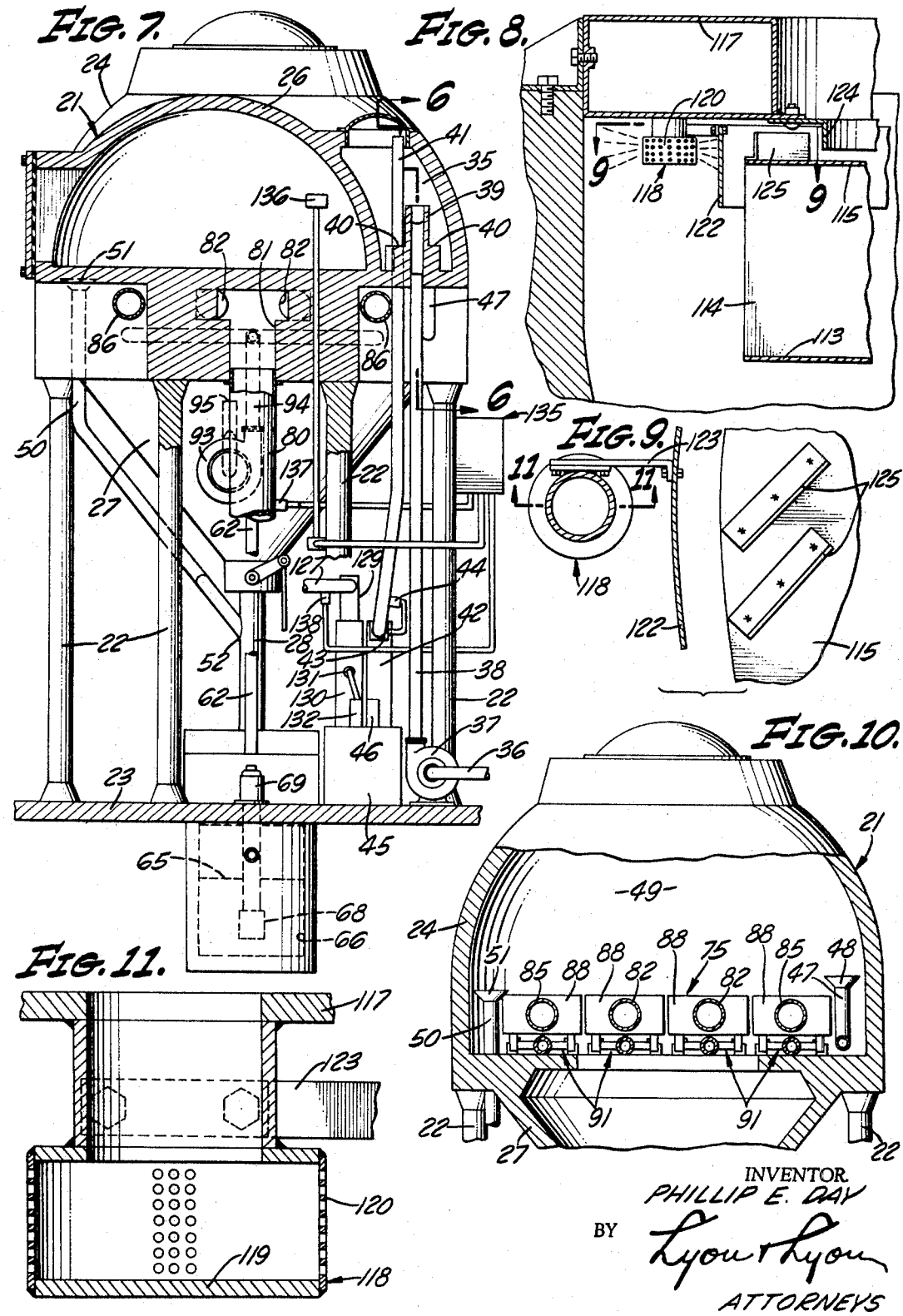

INVENTOR.
PHILLIP E. DAY
BY
Lyon & Lyon
ATTORNEYS

June 25, 1968  P. E. DAY  3,390,057
APPARATUS FOR VAPOR COMPRESSION DISTILLATION OF WATER
Filed Dec. 14, 1964  5 Sheets-Sheet 5
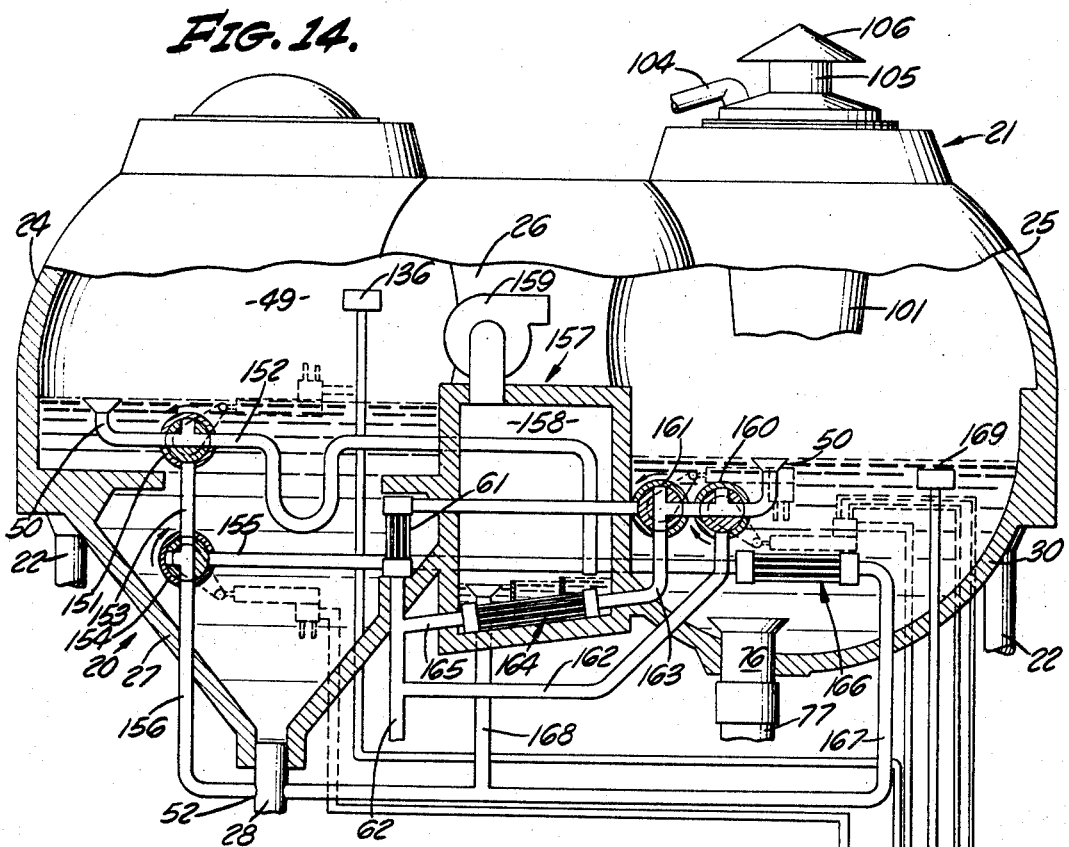
FIG. 14.
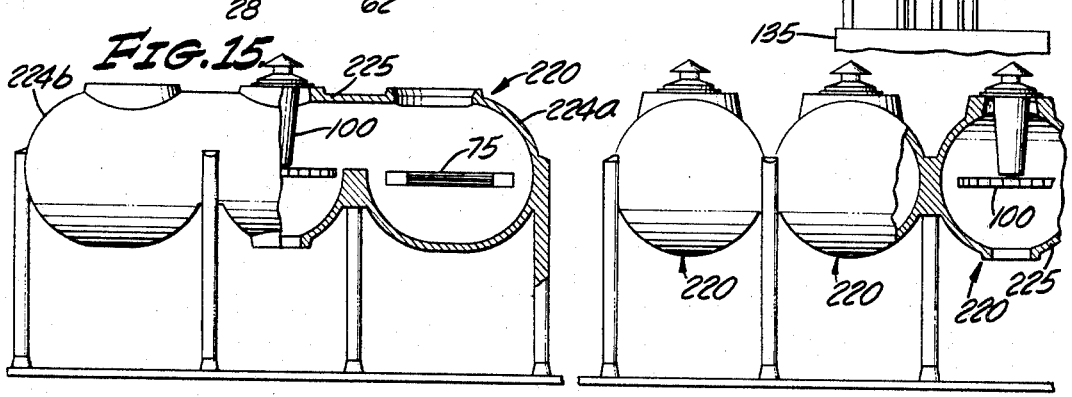
FIG. 15.
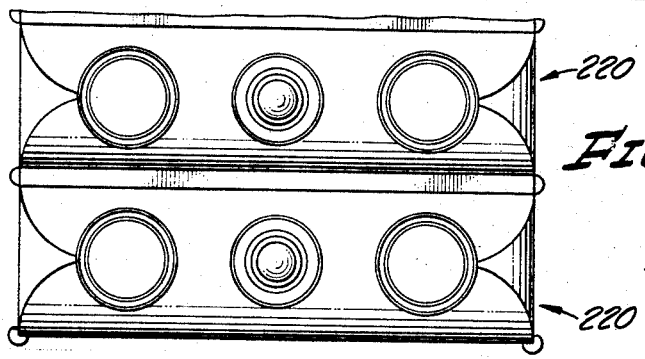
FIG. 16.
FIG. 17.
INVENTOR.
PHILLIP E. DAY
BY Lyon & Lyon
ATTORNEYS

United States Patent Office 3,390,057
Patented June 25, 1968

3,390,057
APPARATUS FOR VAPOR COMPRESSION DISTILLATION OF WATER
Phillip E. Day, Los Angeles, Calif., assignor to Waterdome Corporation, Los Angeles, Calif., a corporation of California
Filed Dec. 14, 1964, Ser. No. 418,149
29 Claims. (Cl. 202—172)

ABSTRACT OF THE DISCLOSURE

A vacumm vessel is provided with separate supply water and distilled water reservoirs and a passageway above and between the reservoirs. The supply water is vaporized by circulating distilled water from the distilled water reservoir through a heat exchanger in the supply water reservoir. A centrifugal compressor, having an impervious bottom, positioned above the water level in the distilled water reservoir so as to form an air space, draws vapor from the passageway, reducing the pressure therein to the saturated vapor pressure of the supply water, and discharges the vapor at an increased pressure into a condensing chamber at its periphery. The circulating distilled water is sprayed into the condensing chamber to condense the compressed vapor. The air pressure in the air space is controlled to be slightly in excess of the saturated vapor pressure of the distilled water in the distilled water reservoir. The speed of the centrifugal compressor may also be controlled.

---

This invention relates to an apparatus and method for economically and efficiently distilling contaminated or saline supply water under production conditions and, in particular, relates to such an apparatus and method employing reduced pressures for evaporating the supply water at non-elevated temperatures.

There is a well-recognized demand for methods and apparatus for producing fresh water suitable for irrigation and human consumption from various types of contaminated water. Most attempts have been directed to the desalinization of sea water due to the obvious unlimited availability of sea water. However, the need for fresh water is not limited to sea coasts and, therefore, it is often extremely desirable to be able to purify other types of brackish and polluted water that may be available.

There are many well known and acceptable processes for accomplishing water purification, but the essence of the problem of salt water conversion or polluted water purification is in achieving efficient production at a sufficiently inexpensive initial investment and continuing production cost. For example, distillation of polluted or salt water by evaporation and condensation accomplishes the desired purification but, heretofor, it has been generally recognized that the power and fuel consumption in simply boiling and condensing the supply water is prohibitively expensive on a commercial basis, as well as requiring a large initial equipment investment for the rate of water production that can be expected. Further, corrosion and deterioration of the equipment is accelerated by the elevated temperatures required for evaporation under atmospheric pressure.

There have been a number of experiments and developments employing greatly reduced pressures to cause water evaporation and condensation in the range of moderate atmospheric temperatures, with such evaporation and condensation being used for many end purposes. For example, the Frenchmen Georges Claude and Paul Boucherot, experimented with the development of useful energy and power from the natural difference in temperature between surface sea water and sea water taken from extreme depths and disclosed their system in U.S. Letters Patent No. 2,006,985, entitled, Method and Apparatus for Obtaining Power from Sea Water. Claude and Boucherot describe and demonstrate that under reduced pressures the warm, surface sea water, will cause evaporation and the colder, deep sea water, will condense such evaporated water, whereby a turbine positioned between the areas of evaporation and condensation will be driven by the vapor migrating therebetween. This reduced pressure evaporation and condensation process has been generally referred to as the "vacuum flash distillation process" whether such is used for driving a turbine or other purposes. The immediately apparent limitation on the use of the vacuum flash distillation process under the conception of Claude and Boucherot is that a coastal location must be found wherein there is a consistent and substantial temperature differential between the surface water and the deep water, and that such deep water is not at a prohibitive distance from the shore. Such locations are not readily available. Moreover, the great quantities of sea water which must be circulated to produce the desired heat transfer would require a pipe of large diameter to bring the cool water from the depths (the cold water pipe used for this purpose by Claude and Boucherot at Matanzas, Cuba, was three meter in diameter) and this pipe offers so much resistance to currents on the ocean floor that in the experiment at Matanzas, at least, the pipe was broken by the current's force. The experiment was a success otherwise and substantiated the underlying theory.

It is, therefore, an object of this invention to create a source of warm water for use in the formation of vapor and a source of cool water for use in condensing vapor thus formed, the warm water and the cool water being kept in separate pools and with means to regulate the difference in the temperatures of the water in each pool to provide the most efficient conditions for distilling water despite a wide variation in supply water temperature such as on the order of 38° F. to 110° F.

It is another object of this invention to provide a novel distillation apparatus and method wherein reduced pressure permits evaporation of the supply water at the most efficient temperature by heating through the use of heat exchange with previously distilled water, and wherein compressing and cooling of the water vapor causes the desired condensation.

Another object of this invention is to provide a novel water distillation apparatus of relatively small and inexpensice construction capable of automatic production of distilled water at substantial volumertic rates.

Another object is to provide a water distillation apparatus which is relatively maintenance-free and durable by reason of the temperatures, pressures and minimal salinity or pollution of the water circulated throughout the apparatus.

A further object of this invention is to provide a novel form of vacuum flash distillation apparatus and method wherein condensation is achieved by a self-stabilizing balance of compression and cooling of the vapors to produce a distillate having a temperature capable of use in transferring heat to the supply water for causing the evaporation portion of the process. A still further object of this invention is to provide such an apparatus and method wherein the previously distilled water first serves to heat the supply water to cause evaporation and then serves to cool and condense the water vapor at an increased pressure.

Still another object of this invention is to provide a novel form of vacuum flash distillation apparatus and method wherein a compressor maintains the necessary reduced pressure for causing evaporation and also serves to raise the pressure of the vapor to a degree for permitting condensation through the addition of cooling, all at relatively small temperature differences. It is a further and more detailed object of this invention to provide such an apparatus wherein the compressor is in the form of a centrifugal compressor positioned directly above the distilled water reservoir with an air space formed therebetween which is pressure controlled to maintain condensation at the outlet of the compressor and yet prohibit water evaporation into the air space from the distilled water reservoir.

Other and more detailed objects and advantages of this invention will appear from the following description and the accompanying drawings, wherein:

FIGURE 1 is a central sectional elevation view of the apparatus of this invention with portions broken away and omitted for clarity of this figure.

FIGURE 2 is an enlarged fragmentary sectional elevation taken substantially on the line 2—2 in FIGURE 3.

FIGURE 3 is a sectional plan view taken substantially on the line 3—3 in FIGURE 1.

FIGURE 4 is a perspective view of the evaporation heat exchange portion of the apparatus of this invention with portions of the apparatus removed for clarity.

FIGURE 5 is an enlarged fragmentary sectional elevation of the evaporation heat exchange portion of the apparatus taken substantially on the line 5—5 in FIGURE 1.

FIGURE 6 is a fragmentary sectional elevation taken substantially on the line 6—6 in FIGURE 7 and illustrating the means of fluid communication between the deaeration and evaporation portions of the apparatus of this invention.

FIGURE 7 is a nend sectional elevation taken substantially on the line 7—7 in FIGURE 1.

FIGURE 8 is an enlarged fragmentary sectional elevation of the condensing area or chamber of the apparatus of this invention taken substantially on the line 8—8 in FIGURE 3.

FIGURE 9 is a fragmentary sectional plan view taken substantially on the line 9—9 in FIGURE 8.

FIGURE 10 is a sectional end elevation of the evaporation heat exchanger portion of the apparatus of this invention taken substantially on the line 10—10 in FIGURE 1.

FIGURE 11 is an enlarged fragmentary sectional view of the cooling water distribution means taken substantially on the line 11—11 in FIGURE 9.

FIGURE 14 is a somewhat schematic sectional elevation similar to FIGURE 12 and illustrating a modified form of control apparatus that may be used in the embodiment of the apparatus of this invention as shown in FIGURES 1–13 for maintaining the proper temperatures and pressures during operation.

FIGURE 15 is a schematic elevation of a modified form of the apparatus of this invention wherein two separate evaporation chambers are employed with each condensing chamber.

FIGURE 16 is a schematic end elevation of the apparatus of FIGURE 15 and illustrates a multiple unit installation.

FIGURE 17 is a plan view of the apparatus of FIGURES 15 and 16.

Figure 12:
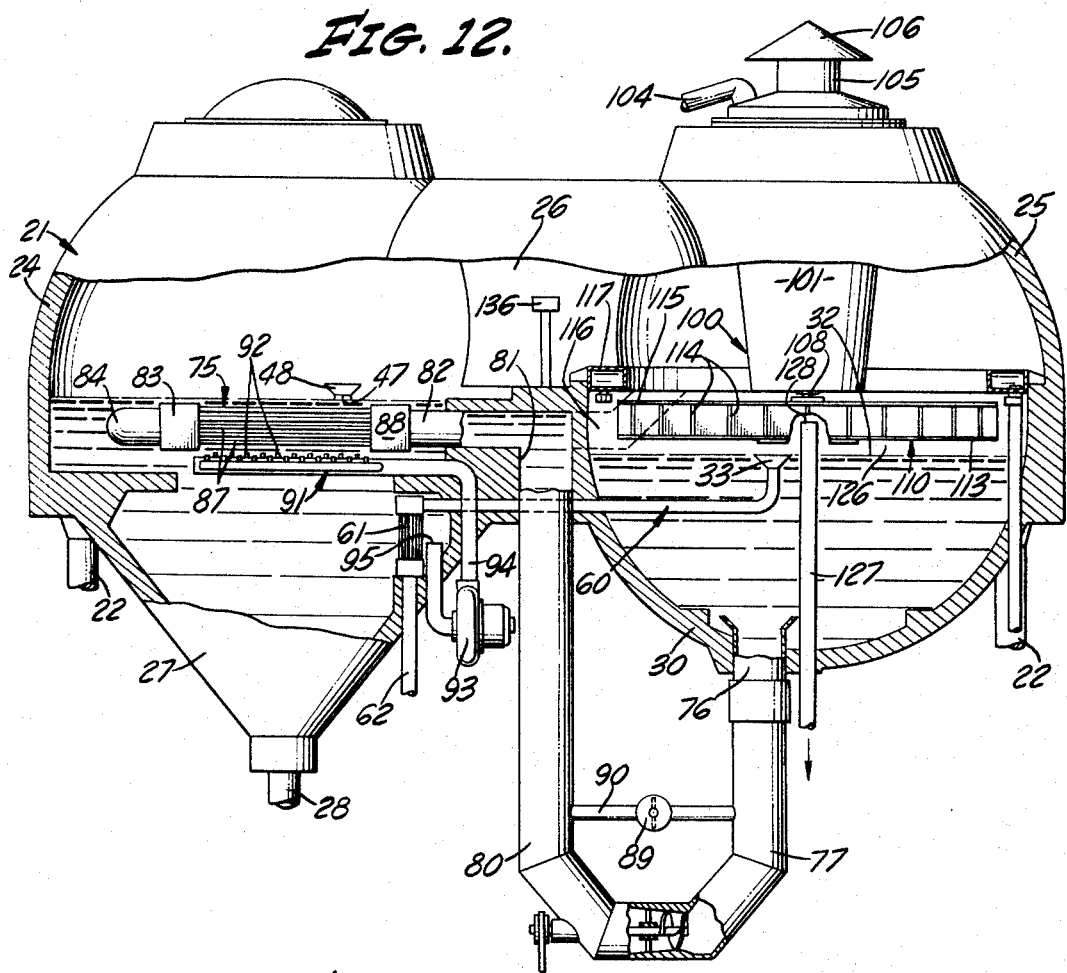
FIGURE 12 is a somewhat schematic sectional elevation similar to FIGURE 1 and illustrating the apparatus of this invention in operation.
Figure 13:
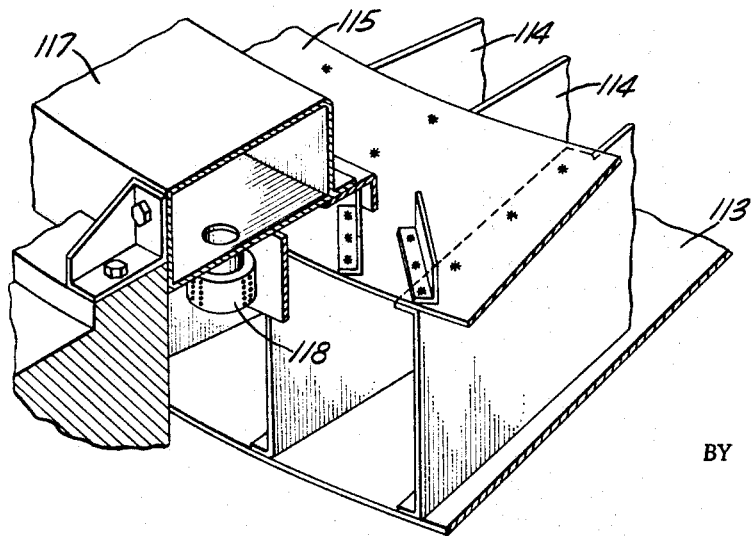
FIGURE 13 is a fragmentary perspective view of a vapor condensing area or chamber of the apparatus with portions of the adjacent compressor and cooling means.

Referring now to the drawings and, more particularly, to FIGURE 1 thereof, the distillation apparatus, generally designated 20, of this invention includes an elongated vacuum vessel, generally designated 21, supported on a multiplicity of column 22. The vacuum vessel 21 may be supported at an appropriate height above the ground or floor 23 to accommodate barometric water column heights in conduits extending from the interior of vacuum vessel 21 to and below floor level 23. For the particular embodiment of apparatus 20 shown in the drawings, support columns 22 would be approximately 25 to 30 feet tall. This arrangement will beneficially conserve ground space and avoid the use of pumps to discharge both the brine and product water from the system against atmospheric pressure thereby effecting a nominal power saving. However, it will readily appear to those skilled in the art that the size, configuration and dimensions of the various components of apparatus 20 may be substantially modified without effecting the operation of, or departing from, this invention.

The vacuum vessel 21 includes a first chamber 24, a second chamber 25 and a passageway 26 between the two chambers. The upper portion of each of chambers 24 and 25 may be of a generally spherical or curved shape to most efficiently withstand the force of the external atmospheric pressure on the partially evacuated chambers. Passageway 26 may be in the form of an archway of substantial cross-sectional area for permitting free communication between the upper portions of chambers 24 and 25. The lower portion 27 of chamber 24 constitutes a supply water reservoir and is generally conical for receiving sediment that may settle out of the supply water contained therein and for directing such sediment to a large drain line 28 extending downwardly from the apex af supply water reservoir 27. A butterfly type valve 29 is operable to selectively permit the sediment to be drained from supply water reservoir 27 through line 28. The lower portion 30 of chamber 25 constitutes a distilled water reservoir and is generally spherical for retaining a large volume of water, but since the water retained therein has been distilled there is no necessity for providing the conical drain arrangement provided in supply water reservoir 27. A circular platform 31 may be mounted within reservoir 30 above the bottom thereof and below the water level 32 as maintained by an overflow funnel 33. The periphery of platform 31 is spaced from the interior wall of reservoir 30 for serving as a baffle to maintain the body of distilled water within the reservoir relatively quiescent and yet permit the high volumetric rate of water flow from the peripheral surface level to the bottom which is necessary for the heat exchange circulation described later in this specification.

As shown in FIGURE 7, adjacent and behind passageway 26, vacuum vessel 21 is provided with a deaeration chamber 35 which is separate and isolated from chambers 24 and 25 and passageway 26. The entire quantity of polluted or salt water, hereinafter referred to as supply water, for convenience, which is run through and distilled by apparatus 20, is brought through deaeration chamber 35 for removing as much dissolved air or other gases from the supply water as possible to avoid the adverse effects such air or gas would otherwise have on the distillation process. The supply water is drawn from its source through a suction line 36 by a pump 37 and pumped to deaeration chamber 35 through a pipe 38. As shown in FIGURES 6 and 7, pipe 38 is connected to an overflow trough 39 positioned within chamber 35 for causing the incoming supply water to flow into deaeration chamber 35 in a thin film for completely exposing the water to the atmosphere of the chamber. A splash ledge 40 may be provided on either side of trough 39 for further agitating and exposing the incoming supply water to the atmosphere of deaeration chamber 35. A suction vent pipe 41 has its open end positioned in the upper portion of deaeration chamber 35 and extends to a vacuum tank 42 for continually evacuating air and other gases from deaeration chamber 35. A valve 43 is provided in line 41 and is controlled by a pressure sensor 44 associated with line 41 for maintaining a predetermined pressure within deaeration chamber 35. For example, it will be assumed that valve 43 is set to maintain a pressure absolute of .625 p.s.i. (pounds per square inch) or, in other words, to reduce the pressure approximately 14 p.s.i. from the normal atmospheric pressure at sea level of 14.7 p.s.i. A vacuum pump 45 is connected through a valve 46 to vacuum tank 42 for continually maintaining an adequate reduced pressure within vacuum tank 42 for maintaining deaeration chamber 35 at the desired pressure.

Throughout this specification, certain pressures and temperatures will be assumed at locations in apparatus 20 such as the afore-described assumed pressure of .625 p.s.i. in deaeration chamber 35, whereby a more comprehensive description of apparatus 20 may be presented. The interrelationship and reasons for the particular temperatures and pressures will be more completely understood and described by way of summation.

As shown in FIGURE 6, deaeration chamber 35 is connected in fluid communication with chamber 24 by means of a conduit 47 in the shape of a trap or inverted siphon. The end of conduit 47 in chamber 24 is provided with a spreading cone 48 positioned above the normal liquid level in reservoir 27 for further exposing the supply water to the deaeration affect of the reduced pressure within chamber 24. The pressure within the vapor space 49 formed in chamber 24 above supply water, the space in passageway 26 and the space in chamber 25 above compressor 110 is maintained at a value less than the pressure within deaeration chamber 35 whereby the supply water will flow from deaeration chamber 35 to reservoir 27. However, the vertical depth of conduit 47 is such as to continually maintain a quantity of liquid in conduit 47 to prevent air or gases from flowing from deaeration chamber 35 into vapor space 49. The pressure in vapor space 49 is approximately at the pressure of saturated water vapor at the particular temperature of the water contained within reservoir 27. Assuming such water temperature is 59° F., the pressure in vapor space 49 will be maintained at .245 p.s.i.

As shown in FIGURE 7, an overflow pipe 50 having a funnel top 51 extends downwardly from within chamber 24 to connect a drain line 28 at a point 52. As shown in FIGURE 1, the bottom end 53 of drain line 28 opens into an overflow basin 54 having walls extending above the level of drain line bottom end 53, whereby a barometric tube is formed by both drain line 28 and overflow pipe 50. The total height of overflow pipe 50 and the pressure within vapor space 49 are such as to cause the water level in overflow pipe 50 to be maintained at least below the funnel top 51. During operation of apparatus 20, supply water is added to reservoir 27 through conduit 47 at a greater rate than the rate of evaporation and, therefore, the concentrated polluted water or brine overflows into pipe 50 to continually maintain the desired liquid level of reservoir 27. This overflowing brine also overflows the walls of basin 54 and drains out through a duct 55 for either disposal or further processing such as atmospheric drying in pans for obtaining salt and other minerals. It will be noted from observing FIGURE 10 that the funnel top 51 of overflow pipe 50 is below the spreading cone 48 of the inlet supply water conduit 47, whereby the water level in reservoir 27 is maintained below the supply water inlet.

Referring again to FIGURE 1, the level 32 of distilled water within to distilled water reservoir 30 is maintained by an overflow pipe 60 which has an open funnel top 33 and is connected through a heat exhanger 61 to a drain pipe 62. The bottom end 63 of drain pipe 62 is positioned within a distilled water overflow basin 64, thereby forming a barometric tube arrangement by reason of the pressure in air spaced 126 above reservoir 30. The basin 64 is provided with a spillway wall 65 into a sump 66. The distilled water is then pumped from sump 66 through a conduit 67 to any desired location or reservoir by means of a pump 68 driven by a motor 69. A perforated metal wall 70 extends upwardly from spillway 65 to the bottom of floor 23 for retaining crushed limestone 71 in overflow basin 64. As the distilled water percolates upwardly from the outlet end 63 of drain pipe 62, small amounts of calcium carbonate are dissolved for improving the taste and reducing the corrosiveness of the water. The overflow basin 64 may be periodically recharged with additional crushed limestone through an open top 72.

Means are provided in supply water reservoir 27 for adding the necessary heat of vaporization to the supply water therein for causing evaporation and, as shown FIGURES 1, 3, 4 and 10 of the drawings, this means may include a heat exchanger assembly, generally designated 75. The vapor pressure in vapor space 49 will continually be maintained at a reduced pressure. Thus, heat exchanger assembly 75 does not serve to appreciably elevate the temperature of the supply water but merely to add the necessary heat of vaporization while the supply water remains at the appropriate temperature for saturated water vapor at that pressure, i.e. 59° F. at .245 p.s.i. This heat is supplied from the distilled water contained in reservoir 30 which is at a higher, but not abnormal, temperature such as 68° F. The small temperature difference of 9° F. indicates the use of large volumes of distilled water and efficient heat exchangers to accomplish the desired heat transfer. Accordingly, and as shown in FIGURE 1, a large intake pipe 76 is connected from the bottom of reservoir 30 through a pipe 77 to a propeller or screw type pump 78 driven by a motor 79. A stand pipe 80 connects the outlet of pump 78 to a manifold duct 81 provided with a pair of ports connected through ducts 82 to separate heat exchange units 83 of heat exchanger assembly 75 (see FIGURE 3). A pair of cross over pipes 84 connect the first heat exchange units 83 to second, outboard heat exchange units 83 which in turn discharge through a pair of separate ducts 85 into a pair of spaced passageways 86 provided in the body of vessel 21. The four heat exchange units 83 comprise heat exchanger assembly 75 and each unit 83 includes a multiplicity of heat exchange tubes 87 extending between tube plates provided in the inlet and outlet boxes 88. Since only distilled water is circulated through the interiors of heat exchange units 83, maintenance will be minimized. As shown in FIGURE 10, heat exchange units 83 are positioned just below the supply water level in supply water reservoir 27 to induce the highest possible rate of vaporization from the surface. The rate of flow of distilled water through heat exchanger assembly 75 may be varied to some degree by appropriately manipulating a butterfly valve 89 provided a bypass conduit 90 connecting pipes 77 and 80 around pump 78 (see FIGURE 1). Referring now to FIGURE 4, the heat transfer from heat exchange tubes 87 to the supply water is assisted by continually maintaining circulation of supply water around the tubes and this may be accomplished by water diffusion jet assemblies, generally designated 91, positioned beneath each of heat exchange units 83. Each jet assembly includes appropriate manifolding for feeding water to a multiplicity of water jets 92 directed upwardly to produce the desired supply water circulation. The water jet assemblies 91 are fed from a pump 93 (FIGURE 1) through a conduit 94. The intake 95 of pump 93 is positioned adjacent the aforementioned heat exchanger 61 for drawing supply water from reservoir 27 past the heat exchange tubes of heat exchanger 61. Thus, the distilled water leaving the apparatus through overflow tube 60, as heretofore described serves to preheat the supply water pumped through water jet assemblies 91. This reduces the heat loss of the entire system in that the distilled water draining from pipe 62 will be at essentially the same temperature as the supply water contained in reservoir 27.

Means are provided for continually removing the vapor flowing into vapor space 49 and maintaining the proper reduced pressure therein and, as shown in FIGURE 1 of the drawings, this means may include a compressor assembly, generally designated 100, mounted in chamber 25 of vessel 21. A motor housing 101 is suspended from the top of chamber 25 and has a mounting base 102 for supporting an electric motor 103 which has its shaft oriented in the vertical direction. Motor housing 101 and base 102 sealably isolate motor 103 from communication with the interior of chamber 25. Motor 103 is of a size and capacity to require substantial cooling and, therefore, a controlled air circulation path is provided having an inlet from a conduit 104 down around the outside of motor 103 and an outlet up a stack 105 which is provided with a hood 106 at its upper end. For increased protection of motor 103, inlet pipe 104 may be connected through a conventional air cooling and filtering apparatus to provide ideal circulating air.

The shaft of motor 103 is connected through a coupling 107 to a bearing supported shaft 108 of a vapor compressor, generally designated 110, of compressor assembly 100. As shown in FIGURES 1 and 3, vapor compressor 110 includes a central hub 111 open only at its bottom 112 and an impervious circular bottom 113 extending outwardly from hub 111. A plurality of vanes 114 are mounted on and perpendicular to bottom 113 and extend radially from hub 111 to the periphery of vapor compressor 110. An annular plate 115 is mounted on the upper edge of vanes 114 at the outer portion of vapor compressor 110. The compressor 110 is rotated by motor 103 and, by reason of this described construction, draws vapor from above the compressor and urges such vapor radially outwardly into the annular space or vapor condensing chamber 116 surrounding compressor 110. The vapor drawn into compressor 110 is drawn from vapor space 49 thereby maintaining the desired reduced pressure in vapor space 49.

In order to condense the vapor compressed into condensing chamber 116 by vapor compressor 110, the vapor must be cooled to and below the temperature at which water is saturated at the particular pressure existing in chamber 116. This cooling is accomplished by intimately comingling cooler distilled water with the compressed vapor. Such cooler distilled water is available from the water that has just been passed through heat exchanger assembly 75 in the aforedescribed manner in that such water will be at or just a degree or two above the temperature of the supply water contained in reservoir 27. Since vapor compressor 110 produces a pressure in condensing chamber 116 which is greater than the saturation pressure maintained in vapor space 49, it is axiomatic that the temperature at which the vapor in chamber 116 will be saturated and condensed to a liquid is higher than the temperature of the supply water in reservoir 27. Thus, the distilled water leaving heat exchanger assembly 75 through passageways 86 can indeed serve to cool and condense the vapor in condensing chamber 116. Passageways 86 are connected to an annular manifold 117 positioned directly above and forming the upper extremity of condensing chamber 116. As shown in FIGURE 8, a multiplicity of spray heads 118 are spaced around and depend from manifold 117. Each spray head 118 has an impervious bottom 119 and a perforated side wall 120 (see FIGURE 11) for directing numerous tiny streams of water radially outwardly from the spray head. This induces intimate comingling between the water from manifold 117 and the vapor in condensing chamber 116 to cause the continual condensation of the compressed vapor introduced into chamber 116. As shown in FIGURE 8, annular manifold 117 is mounted in chamber 25 immediately above vapor compressor 110 and is supported there by a plurality of brackets 121 spaced around its periphery. An annular splash guard 122 is suspended between spray heads 118 and the periphery of vapor compressor 110 to prevent direct impinging upon compressor 110 of water from spray heads 118. Such impinging water would tend to produce an inefficient braking effect on compressor 110 by forcing the compressor to accelerate the water. The splash guard 122 may be mounted in any desired manner such as by brackets 123 mounted on spray heads 118 (see FIGURE 9). A circular vapor baffle 124 is mounted on manifold 117 and extends downwardly toward plate 115 of compressor 110 at a location spaced inwardly from the periphery of the compressor. A multiplicity of baffle vanes 125 are mounted on plate 115 between the location of baffle 124 and the periphery of the plate. The baffle vanes 125 are positioned at an angle to the radius of vapor compressor 110 and appropriately oriented with respect to the direction of rotation thereof for urging vapor outwardly to thereby form a dynamic seal between vapor compressor 110 and manifold 117 whereby compressed vapor in condensing chamber 116 is not permitted to escape through the space between compressor 110 and manifold 117 into the lower pressure area above the compressor.

Referring again to FIGURE 1 and also to FIGURE 12, bottom 113 of compressor 110 is closely spaced from surface 32 of the distilled water contained in distilled water reservoir 30 thereby forming a flat space 126 therebetween. Air tends to accumulate in space 126 from air carried over with the water vapor that was not eliminated in the deaeration process in chamber 35. As air pipe 127 has its open upper end 128 positioned within hub 111 and communicates with air space 126 through the open bottom 112 of the hub. The air pipe 127 is connected to a control valve 129 which in turn is connected to a vacuum tank 130. A pressure switch 131 is sensitive to the pressure within vacuum tank 130 and serves to operate an air valve 132 for connecting vacuum tank 130 to vacuum pump 45 as necessary to maintain the proper reduced pressure in vacuum tank 130. It is preferred that air valves 46 and 132 be interconnected for normally connecting vacuum pump 45 to vacuum tank 42 through valve 46, but closing valve 46 when valve 132 is opened to evacuate vacuum tank 130 thereby only placing a single load on vacuum pump 45 at a given time. The control valve 129 serves to connect pipe 127 to vacuum tank 130 or to atmosphere for either reducing or increasing, respectively, the air pressure within pipe 127. The desired air pressure in air space 126 and, therefore, the pressure in pipe 127 is related to the temperature of the body of distilled water in reservoir 30. In fact, the pressure in air space 126 must be at or exceed the pressure of saturated water vapor at the temperature of the body of distilled water in reservoir 30 to prevent boiling of the water at surface 32 thereby wasting this distilled water by drawing same off through air pipe 127. Thus, if the distilled water is at a temperature of 68° F., as previously assumed, the pressure in air space 126 must be .339 p.s.i. or slightly greater. Further air space 126 serves as a barrier for excluding water vapor from flowing from chamber 116, beneath bottom 113 and into air pipe 127. The accumulating air will tend to build up in air space 126 and rise into condensing chamber 116. However the pressure of the water vapor present in chamber 116 is maintained sufficiently high by compressor 110 to exclude the air from condensation chamber 116, thus the excess air builds up pressure and escapes through pipe 127. Thus, a dynamic balance is automatically achieved between the air in air space 126 and the condensing vapor in chamber 116 by maintaining the desired air pressure in air space 126. Additional control may be exerted by adjusting the rate of vapor compression of compressor 110. For this latter expedient, motor 103 of compressor assembly 100 may be of the adjustable speed type such as a synchronous motor with the current supplied from a conventional static inverter to vary the cycles per second to accomplish the motor speed variation. The speed of motor 103 and, therefore, compressor 110 is automatically adjusted in response to many factors as hereinafter described for producing the proper rate of vapor compression in chamber 116 and vapor removal from vapor space 49.

To facilitate the overall automatic operation of the distillation apparatus 20 of this invention, it is preferred that the various essential operational characteristics and information be supplied to and controlled by a pre-programmed computer, generally designated 135 (see FIGURE 7). In the preferred embodiment of this invention illustrated in FIGURES 1–13, a vapor pressure sensor 136 is mounted for sensing the vapor pressure in vapor space 49 such as by being positioned in passageway 26. A temperature sensitive element 137 is associated with pipe 80 for sensing the temperature of distilled water being supplied to heat exchanger assembly 75. Another pressure sensor 138 is associated with air pipe 127 for monitoring the air pressure within air space 126. The information sensed by pressure sensors 136 and 138 and temperature element 137 is relayed to computer 135 for continual monitoring and correlation to maintain the balanced operation of apparatus 20. There must be a temperature difference between the distilled water pumped into heat exchanger assembly 75 and the supply water within reservoir 27 to accomplish the desried evaporation. Computer 135 is able to determine if such temperature difference exists by reason of the distilled water temperature sensed by element 137 and the vapor pressure sensed by sensor 136 since such vapor pressure is directly related to the temperature of the supply water. If the computer 135 is programmed to maintain, for example, the 9° F. temperature difference heretofore described, wherein the distilled water is at a temperature of 68° F. then sensor 136 must report a vapor pressure of .245 p.s.i., i.e., a supply water tmeperature of 59° F. If the sensed vapor pressure is too high, then the speed of compressor motor 103 may be increased to thereby increase the rate of removal of water vapor from vapor space 49 to in turn reduce the vapor pressure therein. Conversely, if the sensed vapor pressure is too low, the motor speed is reduced. Further, the desired pressure in space 126 is adjusted to the proper level as determined by the distilled water temperature sensed by element 137 to achieve the heretofore described balance between the air space and condensing vapor space.

By this arrangement there is provided a means for distilling water that can be operated at a low cost using supply water at temperatures ranging between approimately 40° F. and 90° F. and for controlling the temperature of the water in both supply water reservoir 27 and distilled water reservoir 30 without special heating apparatus. The energy expended in pumping water and compressing vapor during the distillation process adds approximately 150,000 B.t.u. to the water in the system for each 1,000 gallons of produced water, which is helpful in a situation where the supply water is in the lower portion of this temperature range.

Referring now to the modified form of control system illustrated in FIGURE 14, vacuum vessel 21 and many of the other components of apparatus 20 are substantially identical to the aforedescribed vessel and components except as hereinafter specifically noted and therefore have been omitted for illustration purposes. The overflow pipe 50 in supply water reservoir 27 is not connected directly to drain pipe 28 but rather is connected through a valve 151 to a pair of pipes 152 and 153. Pipe 153 in turn is connected through another valve 154 to another pair of pipes, 155 and 156. Pipe 156 is connected to drain pipe 28 at point 52. An auxiliary evaporating apparatus generally designated 157, is provided and includes a vapor space 158 which may be exhausted by a blower 159 and discharged into passageway 26. The distilled water overflow pipe 60 is provided with a pair of selectively operable valves 160 and 161 between the open inlet end and heat exchanger 61. Pipe 62 connects heat exchanger 61 with the distilled water basin as heretofore described. A pipe 162 is connected between drain pipe 62 and valve 160 for by-passing heat exchanger 61 as desired. A pipe 163 permits distilled water to flow from valve 161 to a heat exchanger 164 provided in auxiliary evaporating apparatus 157 and then through a pipe 165 to drain pipe 62. The pipe 155 is connected through a heat exchanger 166 in communication with the distilled water in reservoir 30. Heat exchanger 166 is then connected through a pipe 167 to drain line 28. A drain pipe 168 is also provided in auxiliary evaporating apparatus 157 for maintaining the desired liquid level. A pressure sensor 136 is associated with vapor space 49 and relates the vapor pressure to computer 135. A temperature sensing element 169 is associated with the body of distilled water within reservoir 30 and relates the sensed temperature to computer 135. With this arrangement of components, distilling apparatus 20 is adapted to be operated at a constant temperature difference between the distilled water in reservoir 30 and the supply water in reservoir 27. Under normal or balanced operating conditions, valves 151 and 154 are arranged for oveflow pipe 50 to be connected directly through pipes 153 and 156 to drain line 28, and for overflow pipe 60 to be connected directly through heat exchanger 61 and to drain line 62. When the pressure sensed by sensor 136 or temperature sensed by element 169 drop below the desired level, valve 151 is operated to direct the overflowing supply water through pipe 152 into auxiliary evaporating apparatus 157 and valve 161 is operated to direct the overflowing distilled water through heat exchanger 164. This causes vaporization of part of the supply water in auxiliary evaporation apparatus 157, the vapor space 158 of which is maintained under a vapor pressure of 1½ oz. per square inch by blower 159. This lowers the temperature of the supply water leaving the system a few degrees thereby adding heat to the water in the system proportional to the supply water leaving the system. Further, the distilled water leaving the system through heat exchanger 164 will have its temperature reduced a few degrees to add heat to the system in addition to the heat it contains in excess of the heat in the supply water reservoir. This heat pump type method of heating the water in the system is simple, economical and completely adequate for the minimal occasions when such is needed. When the pressure and the temperature sensed by components 136 and 169 rise above normal, valves 154 and 160 are actuated to switch the flow of outgoing distilled water directly to drain line 62 and the flow of outgoing supply water through heat exchanger 166 to both cool the distilled water in reservoir 30 and lower the pressure within vapor space 49. This means of regulating the temperature also makes possible a means for controlling the vapor pressure in vapor space 49 that differs from the aforedescribed means employing the variable speed compressor controlled in response to a change in vapor pressure in vapor space 49. Instead of using a variable speed compressor, a more economical and efficient fixed speed compressor and a constant volume pump for circulating distilled water through heat exchanger 75 may be used. The amount of vapor (measured by weight and pressure) generated, would be dependent on the temperature of the water in distilled water reservoir 30.

Referring now to the modified embodiment of FIGURES 15, 16 and 17, the distillation apparatus, generally designated 220, is adapted to perform the same functions described with respect to apparatus 20 and in a substantially similar manner. The configuration of apparatus 220 is modified for more convenient and economical construction as well as a more compact combination with additional units of apparatus 220, as shown in FIGURES 16 and 17, for increased production rates. The chamber 225 is similar in function to chamber 25 but is positioned in the middle of the apparatus 220 with two evaporation chambers 224a and 224b positioned on either side. This arrangement permits the use of a simple structure which is substantially a long cylinder divided into three compartments with curved ends. Chamber 225 is adapted to accommodate compressor assembly 100 in the same fashion and chambers 224a and 224b are elongated to more conveniently accommodate the rectangular heat exchanger assemblies 75. The remaining operative components of apparatus 220 are the same as previously described for apparatus 20 and for convenience of illustration have been omitted from the FIGURES.

As previously related, the practicality of a method and apparatus for sea water purification, distillation or the like, is finally determined by the cost per unit or fresh water obtained. This cost is dependent upon the original cost of the equipment, cost of operation and maintenance, and power consumption cost. When the rate of fresh water production is sufficiently high, the original equipment cost becomes relatively insignificant in determining the cost per unit of water. In the method and apparatus of this invention, the required operation and maintenance cost are minimal and the distilled water production rate sufficiently high to render the power consumption cost the major cost factor. The power consumption of apparatus 20 during operation may be segregated into three separate catagories; one, power to operate vacuum pump 45; two, pumping power consumption; and three, compressing power consumption. A convenient unit of water often used for comparison is the power consumption per 1,000 gallons of fresh water produced. Assuming a daily production rate of 500,000 gallons of distilled water for apparatus 20, vacuum pump 45 must be of approximately a 20-horse power rating. Thus, the power consumption of the vacuum pump may be expressed as follows:

20 HP days × 24 hr./day × .7455 kw. hr./HP hr.
× 1 day/500,000 gal. = .716 kw. hr./1,000 gal.

The power consumption for pumping and compressing is substantially greater than that required for operating the vacuum pump and, therefore, will be referred to as the "direct power consumption." Further, the power consumption for pumping and compressingly by apparatus 20 is a function of the water temperatures at various locations in the apparatus which, in turn, are related to the supply water temperature. For the purposes of illustrating the typical operating characteristics and direct power consumption costs, the following defined values are assumed to be applicable:

$T_0$ = Temperature of the supply water _____ °F__ 70
$T_1$ = Temperature of the water in supply water reservoir 27 _____ °F__ 78
$T_2$ = Temperature of the distilled water as it leaves heat exchanger assembly 75 _____ °F__ 80
$T_3$ = Temperature of the distilled water as it enters the heat exchanger assembly 75 _____ °F__ 86
$HL_1$ = Enthalpy of water in the supply water reservoir _____ B.t.u./lb__ 46
$HL_2$ = Enthalpy of the water in the distilled water reservoir _____ B.t.u./lb__ 54
$HL_3$ = Enthalpy of the distilled water as it leaves the heat exchanger _____ B.t.u./lb__ 48
$HV_1$ = Enthalpy of the vapor in the vapor space _____ B.t.u./lb__ 1095.8
$HV_2$ = Enthalpy of the vapor in the condensing chamber _____ B.t.u./lb__ 1099.2

$W_1 = \dfrac{HV_1 - HL_1}{HL_2 - HL_3}$ = Amount of warm distilled water required to circulate through the heat exchanger to form one lb. of water vapor lb. 175.

$HV_2 - HV_1$ = Increase in enthalpy of the vapor resulting from compression of the vapor ____ B.t.u./lb__ 3.4
$HL_2 - HL_1$ = Increase in enthalpy of the water evaporated from the supply water reservoir and condensed in the condensing chamber _____ B.t.u./lb__ 8.0
Velocity of distilled water in the tubes of heat exchanger assembly 75 _____ ft./sec__ 5
Velocity of water in the supply water reservoir circulating upwards about the tubes of heat exchanger assembly 75 _____ ft./sec__ 5

*Direct power consumption*

Power consumption rate for compressor (assuming a compressor of 85% efficiency):

$$3.4 \, \frac{\text{B.t.u.}}{\text{lb.}} \times \frac{8330 \text{ lb.}}{1000 \text{ gal.}}$$
$$\times .9475 \times 10^{-3} \, \frac{\text{kw. hr.}}{\text{B.t.u.}} \times \frac{1}{.85} = 31 \, \frac{\text{kw. hr.}}{1000 \text{ gal.}}$$

Power consumption rate for circulation through heat exchanger (assuming pumps of 80% effifficiency):

175 lb. × 15 ft. (head loss)
$$\times \frac{8330 \text{ lb.}}{1000 \text{ gal.}} \times .3766 \times 10 \, \frac{\text{kw. hr.}}{\text{ft. lb.}} \times \frac{1}{.80} = 10.3 \, \frac{\text{kw. hr.}}{1000 \text{ gal.}}$$

Power consumption rate for circulation about heat exchanger estimated to be 4.7 kw. hr./1000 gal.

Thus, total direct power consumption rate equals 46.0 kw. hr./1000 gal.

The efficiency of apparatus 20 in terms of cost of distilled water production will vary in accordance with changes in temperatures within the apparatus and the supply water tempearture. However, throughout these wide temperature variations the direct power cost remains in a reasonable and economical range. Throughout specification apparatus 20 has generally been described as in a dynamic operating condition, since this is the condition of major importance and since the apparatus is adapted to operate continually. However, various auxiliary apparatus may be provided for initiating the operation of apparatus 20, such as a fresh-water supply line having a control valve for supplying fresh water to distilled water reservoir 30 through manifold 117 to establish the body of water necessary for heat exchange circulation by pump 78. Once operation of apparatus 20 has been established, fresh-water line serves no operative function. Also, access openings may be provided for maintenance purposes such as a door and removable domes.

Having fully described my invention, it is to be understood that I do not wish to be limited to the details herein set forth or the details illustrated in the drawings, but my invention is of the full scope of the appended claims.

I claim:
1. An apparatus for distilling water comprising:
   a supply water reservoir, a distilled water reservoir and a vapor space above said supply water reservoir;
   means for vaporizing the supply water in said supply water reservoir;
   centrifugal compressor means positioned above the surface of the water in said distilled water reservoir so as to form an air space therebetween, a condensing chamber located above the surface of said distilled water around the periphery of said compressor, said compressor means being operative to draw vapor from said vapor space and to compress said vapor and discharge said compressed vapor into said condensing chamber;
   means for intimately comingling distilled water with said compressed vapor in said condensing chamber for cooling and condensing said vapor, whereby said condensed vapor and said distilled water fall into said distilled water reservoir; and
   means for controlling the air pressure in said air space so as to concentrate said compressed vapor in said condensing chamber and to prevent evaporation of distilled water from said distilled water reservoir.
2. The apparatus of claim 1 wherein said centrifugal compressor means has an impervious bottom, and further comprising:
   means for maintaining a distilled water level in said distilled water reservoir closely spaced from said impervious bottom so as to form said air space.
3. The apparatus of claim 2 wherein said means for vaporizing said supply water comprises:

heat exchange means in said supply water reservoir; and means for circulating distilled water from said distilled water reservoir through said heat exchange means for heating and evaporating said supply water.

4. The apparatus of claim 3 wherein said means for intimately comingling distilled water is operative to intimately comingle the circulating distilled water from said head exchange means with said compressed vapor in said condensing chamber.

5. The apparatus of claim 4 wherein said controlling means is operative to maintain said air pressure at a value in excess of the saturated vapor pressure of the distilled water in said distilled water reservoir.

6. The apparatus of claim 3 wherein said means for comingling comprises:
a circular manifold surrounding said compressor means and positioned immediately above said condensing chamber; and
means connecting said manifold to the outlet of said heat exchange means for receiving the circulating distilled water, said circular manifold including means for forming a plurality of streams of distilled water whereby said streams of distilled water fall from said manifold through said condensing chamber so as to be intimately comingled with said compressed vapor in said condensing chamber.

7. The apparatus of claim 1 wherein said centrifugal compressor means comprises a horizontally positioned vane compressor with an impervious bottom, and further comprising:
means for maintaining a distilled water level in said distilled water reservoir closely spaced from said impervious bottom so as to form said air space.

8. The apparatus of claim 4 wherein said means for intimately comingling distilled water is operative to intimately comingle the circulating distilled water from said heat exchange means with said compressed vapor in said condensing chamber.

9. The apparatus of claim 8 wherein said controlling means is operative to maintain said air pressure at a value in excess of the saturated vapor pressure of the distilled water in said distilled water reservoir.

10. The apparatus of claim 9 further comprising:
means for varying the rate of compression of said compressor means; and
means responsive to the vapor pressure in said vapor space and the temperature of said distilled water in said distilled water reservoir for controlling said compression rate varying means so as to maintain a substantially fixed temperature difference between the water in said supply water reservoir and the water in said distilled water reservoir.

11. The apparatus of claim 1 wherein said controlling means is operative to control said air pressure as a function of the temperature of the water in said distilled water reservoir.

12. The apparatus of claim 1 wherein said controlling means is operative to maintain said air pressure at a value in excess of the saturated vapor pressure of the distilled water in said distilled water reservoir.

13. The apparatus of claim 1 wherein said supply water reservoir, said distilled water reservoir, said vapor space and said centrifugal compressor means are contained in a common housing so as to permit the movement of a large volume of vapor at a relatively low velocity.

14. The apparatus of claim 1 further comprising:
means for varying the rate of compression of said compressor means; and
means responsive to the vapor pressure in said vapor space and the temperature of said distilled water in said distilled water reservoir for controlling said compression rate varying means so as to maintain a substantially fixed temperature difference between the water in said supply water reservoir and the water in said distilled water reservoir.

15. An apparatus for distilling water comprising:
a vacuum vessel containing a supply water reservoir, a distilled water reservoir and a space above said reservoirs for permitting vapor from said supply water reservoir to flow to said distilled water reservoir;
means for maintaining a distilled water level in said distilled water reservoir;
means for vaporizing said supply water;
centrifugal compressor means having an impervious bottom positioned above said distilled water level so as to form an air space therebetween, a condensing chamber located above the surface of said distilled water around the periphery of said compressor, said compressor means being operative to draw vapor from and reduce the pressure in said vapor space to approximately the saturated vapor pressure of water at the temperature of said supply water in said supply water reservoir and to discharge said vapor at an increased pressure into said condensing chamber;
means for intimately comingling distilled water with said compressed vapor in said condensing chamber for cooling and condensing said compressed vapor to distilled water; and
means for maintaining an air pressure in said air space slightly in excess of the saturated vapor pressure of the distilled water in said distilled water reservoir.

16. The apparatus of claim 15 wherein said means for vaporizing said supply water comprises:
heat exchange means in said supply water reservoir; and
means for circulating distilled water from said distilled water reservoir through said heat exchange means for heating and evaporating said supply water.

17. The apparatus of claim 16 wherein said means for comingling is operative to intimately comingle the circulating distilled water from said heat exchange means with said compressed vapor in said condensing chamber.

18. The apparatus of claim 16 wherein said means for comingling comprises:
a circular manifold surrounding said compressor means and positioned immediately above said condensing chamber; and
means connecting said manifold to the outlet of said heat exchange means for receiving the circulating distilled water, said circular manifold including means for forming a plurality of streams of distilled water whereby said streams of distilled water fall from said manifold through said condensing chamber so as to be intimately comingled with said compressed vapor in said condensing chamber.

19. The apparatus of claim 18 further comprising:
means for sensing the air pressure in said air space; and
means for sensing the temperature of the distilled water in said distilled water reservoir, said means for maintaining an air pressure in said air space being responsive to said pressure sensing means and said temperature sensing means.

20. The apparatus of claim 15 further comprising:
means for sensing the air pressure in said air space; and
means for sensing the temperature of the distilled water in said distilled water reservoir, said means for maintaining an air pressure in said air space being responsive to said pressure sensing means and said temperature sensing means.

21. The apparatus of claim 15 further comprising:
means for varying the rate of compression of said compressor means; and
means responsive to the vapor pressure in said vapor space and the temperature of said distilled water in said distilled water reservoir for controlling said compression rate varying means so as to maintain a substantially fixed temperature difference between the water in said supply water reservoir and the water in said distilled water reservoir.

22. An apparatus for distilling water comprising:
a vacuum vessel containing separate supply water and distilled water reservoirs and a passageway above said reservoirs therebetween;
heat exchange means in said supply water reservoir;
means for circulating distilled water from said distilled water reservoir through said heat exchange means for heating and evaporating said supply water;
centrifugal compressor means positioned above the water level in said distilled water reservoir so as to form an air space, said compressor means being operative to draw vapor from and reduce the pressure in said passageway to approximately the saturated vapor pressure of water at the temperature of said supply water in said supply water reservoir and to discharge said vapor at an increased pressure at its periphery;
means positioned above said periphery of said compressor means so as to separate said passageway from said air space thereby forming a condensing chamber therebetween;
means for intimately comingling said circulating distilled water from said heat exchange means with said compressed vapor in said condensing chamber for cooling and condensing said compressed vapor to distilled water; and
means for maintaining an air pressure in said air space slightly in excess of the saturated vapor pressure of the distilled water in the distilled water reservoir.

23. The apparatus of claim 22 wherein said means positioned above said periphery comprises:
a circular manifold surrounding said compressor means and coupled to the outlet of said heat exchange means for receiving the circulating distilled water; and wherein said means for comingling comprises:
means coupled to said manifold for forming a plurality of tiny streams of distilled water whereby said streams of distilled water fall from said manifold through said condensing chamber so as to be intimately comingled with said compressed vapor.

24. The apparatus of claim 22 further comprising:
means for sensing the air pressure in said air space; and
means for sensing the temperature of the distilled water in said distilled water reservoir, said means for maintaining an air pressure in said air space being responsive to said pressure sensing means and said temperature sensing means.

25. The apparatus of claim 22 further comprising:
means for varying the rate of compression of said compressor means; and
means responsive to the vapor pressure in said passageway and the temperature of said distilled water in said distilled water reservoir for controlling said compression rate varying means so as to maintain a substantially fixed temperature difference between the water in said supply water reservoir and the water in said distilled water reservoir.

26. An apparatus for distilling water comprising:
a vacuum vessel having separate supply water and distilled water reservoirs and a passageway above said reservoirs therebetween;
centrifugal compressor means positioned above the water level in said distilled water reservoir so as to form an air space, said compressor means being operative to draw vapor from and reduce the pressure in said passageway to approximately the saturated vapor pressure of water at the temperature of said supply water in said supply water reservoir and to discharge said vapor at an increased pressure into a condensing chamber located around its periphery;
heat exchange means in said supply water reservoir;
means for circulating distilled water from said distilled water reservoir through said heat exchange means for heating and evaporating said supply water;
means for intimately comingling the circulating distilled water from said heat exchange means with said compressed vapor in said condensing chamber for cooling and condensing said compressed vapor to distilled water;
means for varying the rate of compression of said compressor means; and
means responsive to the vapor pressure in said passageway and the temperature of said distilled water in said distilled water reservoir for controlling said compression rate varying means so as to maintain a substantially fixed temperature difference between the water in said supply water reservoir and the water in said distilled water reservoir.

27. The apparatus of claim 26 wherein said means for comingling comprises:
a circular manifold surrounding said compressor means and positioned immediately above said condensing chamber; and
means connecting said manifold to the outlet of the heat exchange means for receiving the circulating distilled water, said circular manifold including means for forming a plurality of streams of distilled water whereby said streams of distilled water fall from said manifold through said condensing chamber so as to be intimately comingled with said compressed vapor in said condensing chamber.

28. An apparatus for distilling water comprising:
a vacuum vessel having separate supply water and distilled water reservoirs and a passageway above said reservoirs therebetween;
centrifugal compressor means positioned above the water level in said distilled water reservoir so as to form an air space, said compressor means being operative to draw vapor from and reduce the pressure in said passageway to approximately the saturated vapor pressure of water at the temperature of said supply water in said supply water reservoir and to discharge said vapor at an increased pressure into a condensing chamber located around its periphery;
heat exchange means in said supply water reservoir;
means for circulating distilled water from said distilled water reservoir through said heat exchange means for heating and evaporating said supply water;
means for intimately comingling the circulating distilled water from said heat exchange means with said compressed vapor in said condensing chamber for cooling and condensing said compressed vapor to distilled water;
first means for selectively circulating a portion of said produced distilled water in heat exchange relation with a portion of said supply water for warming and evaporating such supply water;
means for directing such evaporated supply water into said passageway;
second means for selectively circulating said portion of said supply water in heat exchange relation with said distilled water in said distilled water reservoir; and
control means responsive to the vapor pressure in said passageway and the temperature of said distilled water in said distilled water reservoir for selectively operating said first and second means so as to mainmain a substantially constant temperature difference between the water in said supply water reservoir and the water in said distilled water reservoir.

29. An apparatus for distilling water comprising: a supply water reservoir, a distilled water reservoir and a vapor space above said supply water reservoir: means for vaporizing the supply water in said supply water reservoir comprising heat exchange means in said supply water reservoir and means for circulating distilled water from said distilled water reservoir through said heat exchange means for heating and evaporating said supply water;

centrifugal compressor means positioned above the surface of the water in said distilled water reservoir so as to form an air space therebetween, said compressor means being operative to draw vapor from said vapor space and to compress said vapor and discharge said compressed vapor into a condensing chamber located above the surface of said distilled water at the periphery of said compressor;

means for intimately comingling distilled water with said compressed vapor in said condensing chamber for cooling and condensing said vapor, whereby said condensed vapor and said distilled water fall into said distilled water reservoir; and means for controlling the air pressure in said air space so as to concentrate said compressed vapor in said condensing chamber and to prevent evaporation of distilled water from said distilled water reservoir.

References Cited

UNITED STATES PATENTS

| | | | |
|---|---|---|---|
| 585,365 | 6/1897 | Skiffington | 165—108 |
| 849,579 | 4/1907 | Siebel | 203—26 |
| 1,331,533 | 2/1920 | Simpson | 202—172 |
| 1,496,392 | 6/1924 | Todd | 202—172 |
| 2,006,985 | 7/1935 | Claude et al. | 202—185.2 |
| 2,441,361 | 5/1948 | Kirgan | 202—160 |
| 2,619,453 | 11/1952 | Andersen | 203—24 |
| 2,915,462 | 12/1959 | Salmon | 203—2 |
| 3,039,941 | 6/1962 | Sweeney et al. | 203—2 |
| 3,192,130 | 6/1965 | Pottharst | 203—26 |
| 3,200,050 | 8/1965 | Hogan | 203—24 |
| 3,206,380 | 9/1965 | Daviau | 203—22 |
| 3,214,352 | 10/1965 | Wells | 203—91 |
| 3,288,685 | 11/1966 | Kemper et al. | 203—26 |

FOREIGN PATENTS 1,342,454          France.

WILBUR L. BASCOMB, JR., *Primary Examiner.*